Figure 3:
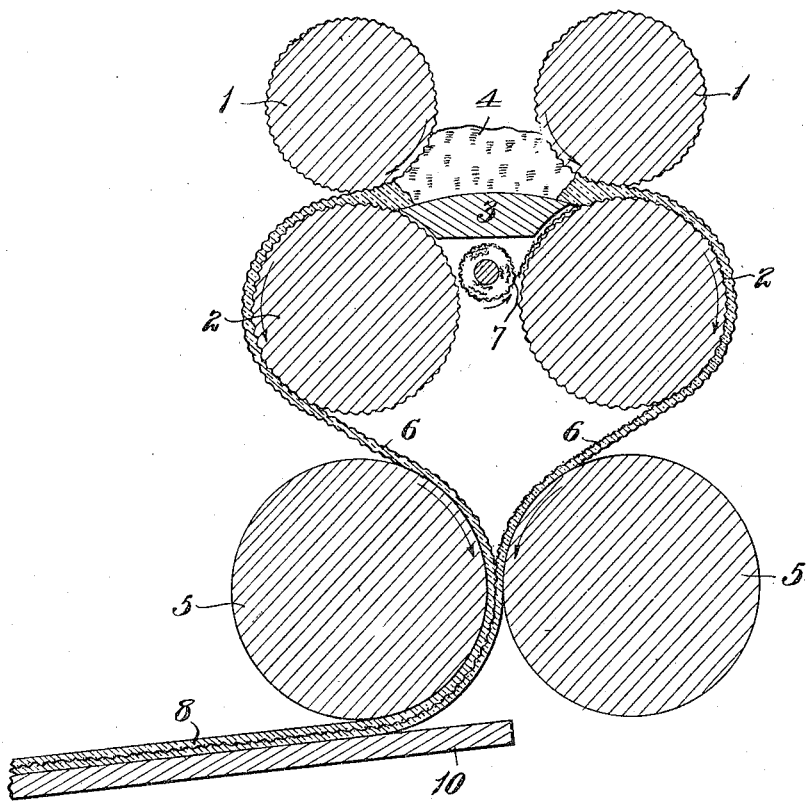

J. W. HOYER.
METHOD OF AND MACHINE FOR MAKING WIRE GLASS.
APPLICATION FILED DEC. 2, 1907.
959,537.
Patented May 31, 1910.
2 SHEETS—SHEET 1.
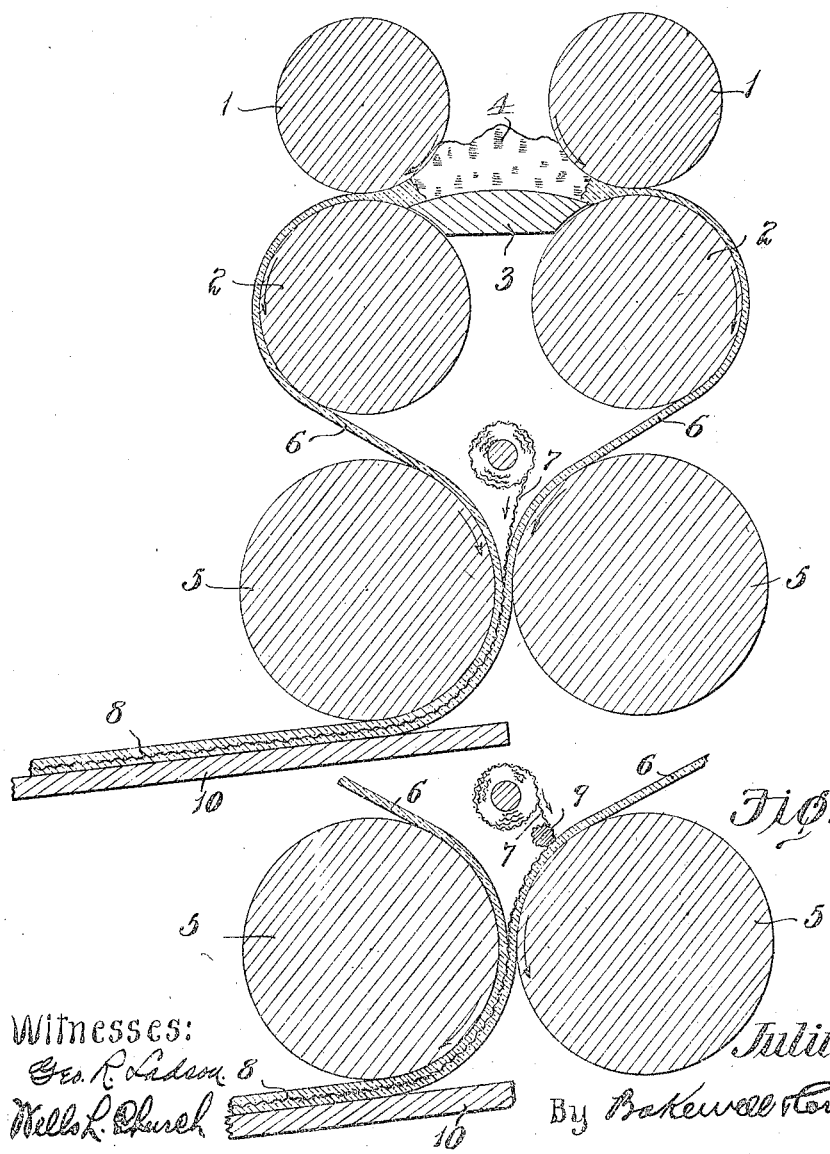

UNITED STATES PATENT OFFICE.

JULIUS W. HOYER, OF ST. LOUIS, MISSOURI, ASSIGNOR TO MISSISSIPPI WIRE GLASS COMPANY, OF NEW YORK, N. Y., A CORPORATION OF NEW JERSEY.

METHOD OF AND MACHINE FOR MAKING WIRE-GLASS.

959,537.  Specification of Letters Patent.  Patented May 31, 1910.

Application filed December 2, 1907. Serial No. 404,721.

*To all whom it may concern:*

Be it known that I, JULIUS W. HOYER, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figure 1 shows one form of apparatus that may be used for carrying out my method; Fig. 2 shows a different way from that shown in Fig. 1 of interposing the wire mesh between the layers of the sheet; and Fig. 3 shows still another way in which the wire mesh can be arranged in position.

This invention relates to the manufacture of wire glass.

One object of my invention is to provide a novel method of making wire glass.

Another object is to provide an apparatus for practicing my method.

Briefly stated, my method consists in forming two independent layers from a single mass of molten glass, interposing a piece of wire mesh or fabric between said layers, and thereafter combining said layers together.

In Fig. 1 I have illustrated the apparatus which I use for practicing my method, said apparatus comprising two pairs of rolls 1 and 2 arranged on opposite sides of a table or supporting surface 3 upon which the mass of molten glass 4 is poured. A pair of rolls 5 is arranged underneath the rolls 2 and said rolls 5 are separated from each other the distance which it is desired the finished sheet metal shall be. The sheet is formed from a single mass of molten glass 4 which is dumped onto the table 3 between the rolls 1, these rolls and their coöperating rolls 2, which revolve in the direction of the arrows indicated in Fig. 1, forming the mass of glass into two independent layers 6 which move downwardly over the rolls 2 and thence between the rolls 5 where they are combined together to form the finished sheet 8, the rolls 5 preferably having smooth faces so as to impart finished surfaces to the sheet 8.

A piece of wire mesh or fabric 7 is arranged between the layers 6 before the layers are combined together. This wire fabric may be inserted between the layers simultaneously with the operation of combining the layers together, as shown in Fig. 1, or the wire fabric can be forced into the inner face of one of the layers just prior to the operation of combining the layers together, as shown in Fig. 2, the apparatus comprising a corrugated roller 9 that is used for this purpose, this roller being located between one of the rolls 5 and the supply of wire mesh. If desired, the wire mesh can be forced into the inner face of one of the layers simultaneously with the operation of forming said layer, as shown in Fig. 3, the wire mesh leading from its supply and passing over the upper surface of one of the rolls 2. If desired, a tension device can be used under which the wire mesh passes so as to cause said mesh to cut its way into the inner face of one of the layers 6; or, if desired, the rolls 2 can be provided with corrugated surfaces, as shown in Fig. 3, so that the wire mesh will be forced positively into the inner face of one of the layers. It is also possible to use corrugated rolls 1 coöperating with the rolls 2 as the finished surfaces of the sheet 8 are produced by the smooth surfaced rolls 5, one advantage in using corrugated rolls 1 and 2 being that they feed the layers 6 positively into position between the rolls 5. The apparatus, of course, will be provided with a chute or table 10 to receive the finished sheet as it emerges from the rolls 5.

Having thus described my invention, what I claim as new and desire to secure by Letters Patent is:

1. The method of making wire glass which consists in dumping a mass of molten glass onto a fixed stationary support or table, rolling said mass of glass in opposite directions to form two independent layers of glass, combining said layers together with pressure to form a single finished sheet of glass, and interposing a piece of wire mesh or fabric between the two layers of glass at the time the same are combined, substantially as set forth.

2. The herein described method of making wire glass which consists in placing a single mass of molten glass upon a stationary table, and drawing it in opposite directions between two pairs of rollers to form two layers of uniform thickness, interposing a piece of wire fabric between said layers and finally passing the two layers between a pair of rollers to combine the same and form a finished sheet of glass.

3. The herein described method of making wire glass consisting in dumping a mass of molten glass onto a stationary support, feeding the mass of glass from the opposite ends of support to form two independent layers, combining said layers together to form a finished sheet and interposing a piece of wire fabric between the layers before the same are combined.

4. An apparatus for making wire glass comprising a horizontally disposed supporting surface, a pair of rolls arranged on each side of said surface for forming a single mass of molten glass into two independent layers, means for introducing a wire mesh between said layers, and means for combining said layers together after said wire mesh is introduced therebetween; substantially as described.

5. An apparatus for making wire glass comprising a horizontally disposed supporting surface, a pair of rolls arranged at each side of said surface to form a mass of glass deposited on said surface into two independent layers, rolls arranged underneath said forming rolls for combining said layers together, and means for embedding a wire mesh in the inner face of one of said layers prior to combining said layers together; substantially as described.

6. An apparatus for making wire glass comprising a fixed support adapted to receive a mass of molten glass, layer forming means located on opposite sides of the support, finishing rolls adapted to receive the layers formed by the means at the sides of the support and means for delivering a section of wire netting between the layers of glass before the same pass to the finishing rolls.

7. An apparatus for making wire glass consisting of two pairs of layer forming rolls, a fixed support between said pairs of rolls, which support is adapted to receive a mass of molten glass, a pair of finishing rolls adapted to receive the layers of glass after the same leave the layer forming rolls and a wire mesh feeding means arranged between the pairs of layer forming rolls and the finishing rolls.

8. An apparatus for making wire glass, comprising a horizontally disposed table for receiving a batch of molten glass, a pair of horizontally disposed rolls arranged adjacent each end of said table and adapted to roll the mass of molten glass on the table into two layers of uniform thickness, and means for arranging a reinforcing member between said layers and combining them together to form a single sheet of glass; substantially as described.

In testimony whereof I hereunto affix my signature in the presence of two witnesses, this twenty-sixth day of November 1907.

JULIUS W. HOYER.

Witnesses:
 ROBERT A. B. WALSH,
 GEORGE BAKEWELL.